United States Patent
Ross (10) Patent No.: US 9,562,557 B2
(45) Date of Patent: Feb. 7, 2017

(54) PUNCH PINS, ASSOCIATED SOCKETS, AND METHODS OF FORMING SOCKETS USING PUNCH PINS

(71) Applicant: Acument Intellectual Properties, LLC, Sterling Heights, MI (US)

(72) Inventor: Gerold Ross, Bonefeld (DE)

(73) Assignee: Acument Intellectual Properties, LLC, Sterling Heights, MI (US)

( * ) Notice: Subject to any disclaimer, the term of this patent is extended or adjusted under 35 U.S.C. 154(b) by 0 days.

(21) Appl. No.: 14/507,344

(22) Filed: Oct. 6, 2014

(65) Prior Publication Data

US 2015/0104271 A1 Apr. 16, 2015

Related U.S. Application Data

(60) Provisional application No. 61/889,367, filed on Oct. 10, 2013.

(51) Int. Cl.
| | |
|---|---|
| *F16B 35/06* | (2006.01) |
| *F16B 23/00* | (2006.01) |
| *B21K 1/46* | (2006.01) |

(52) U.S. Cl.
CPC ............ *F16B 23/003* (2013.01); *B21K 1/463* (2013.01)

(58) Field of Classification Search
CPC ..... F16B 23/00; F16B 23/003; F16B 23/0038; F16B 23/0046; F16B 23/0007; F16B 35/06
USPC ................. 411/402–403; 81/124.2, 436, 460
See application file for complete search history.

(56) References Cited

U.S. PATENT DOCUMENTS

| | | | | |
|---|---|---|---|---|
| 1,908,080 A | * | 5/1933 | Thompson | F16B 23/0023 16/DIG. 39 |
| 2,083,092 A | * | 6/1937 | Richer | 411/403 |
| 2,216,382 A | * | 10/1940 | West | F16B 23/0023 411/403 |
| 2,285,461 A | * | 6/1942 | Purtell | F16B 23/0007 411/403 |
| 2,777,353 A | * | 1/1957 | Willis | 411/403 |
| 2,969,250 A | * | 1/1961 | Kull | B25B 13/065 403/345 |
| 3,187,790 A | * | 6/1965 | Wing | B25B 15/005 403/364 |
| 3,329,057 A | * | 7/1967 | Salz | F16B 23/0007 411/366.1 |
| 3,352,190 A | * | 11/1967 | Carlson | 411/403 |
| 3,584,667 A | | 6/1971 | Reiland | |
| 5,019,080 A | * | 5/1991 | Hemer | 606/104 |

(Continued)

OTHER PUBLICATIONS

International Search Report and Written Opinion which issued in connection with corresponding PCT Application No. PCT/US2014/059333 on Jan. 15, 2015.

*Primary Examiner* — Roberta Delisle
(74) *Attorney, Agent, or Firm* — Clark Hill PLC; James R. Foley (57) ABSTRACT

Punch pins which have further extending lobes, and which are designed to punch sockets that have deeper flutes while not having lobes which extend further toward a center axis of the fastener. Using such a punch pin to form a socket in a fastener provides that the resulting socket has flutes which are deeper than they otherwise would be, without having to provide corresponding lobes which extend further toward the center axis of the socket. This extra deepness in the flutes helps to provide extra room for a coating to deposit.

20 Claims, 9 Drawing Sheets

(56) References Cited

U.S. PATENT DOCUMENTS

| | | | |
|---|---|---|---|
| 5,207,132 | A | 5/1993 | Goss et al. |
| 5,279,190 | A | 1/1994 | Goss et al. |
| 5,461,952 | A | 10/1995 | Goss |
| 5,577,871 | A | 11/1996 | Brugola |
| 6,951,158 | B1 * | 10/2005 | Edland ................. B25B 15/005 411/404 |
| 6,997,085 | B2 * | 2/2006 | Yamamoto ................... 81/121.1 |
| 7,225,710 | B2 | 6/2007 | Pacheco, Jr. |
| 2003/0002952 | A1 * | 1/2003 | Totsu ...................... B21K 1/46 411/403 |
| 2006/0110237 | A1 * | 5/2006 | Belinda ................ B25B 15/005 411/403 |
| 2009/0003967 | A1 * | 1/2009 | Luna ........................... 411/404 |
| 2010/0129176 | A1 * | 5/2010 | Karupaya ............... B21K 1/463 411/404 |
| 2012/0099944 | A1 * | 4/2012 | Kageyama ........... B25B 15/005 411/403 |
| 2013/0068075 | A1 * | 3/2013 | Stiebitz et al. ................. 81/460 |
| 2013/0213193 | A1 | 8/2013 | Lukes |

* cited by examiner

PUNCH PINS, ASSOCIATED SOCKETS, AND METHODS OF FORMING SOCKETS USING PUNCH PINS

RELATED APPLICATION (PRIORITY CLAIM)

This application claims the benefit of U.S. Provisional Application Ser. No. 61/889,367, filed Oct. 10, 2013, which is hereby incorporated herein by reference in its entirety.

FIELD OF THE INVENTION

The invention relates to punch pins used to form drive configurations in fastener heads. More specifically, the invention relates to punch pins used to form drive configurations in smaller-sized fastener heads which are to be coated after formation, the resultant smaller-sized fastener heads formed by the punch pins, and the methods of forming and coating such smaller-sized fastener heads.

BACKGROUND OP THE INVENTION

Since its invention, the TORX PLUS® brand drive system has consistently outperformed every other drive system on the market. Its longer tool life and optimal torque transfer have enhanced product reliability, increased productivity, and reduced total assembly costs on assembly lines in a multitude of industries around the world. The TORX PLUS® brand drive system has an elliptically-based geometry, a zero degree drive angle, six lobes with large cross-sectional area, vertical sidewalls and reduced recess fallaway, and greatly increased strength and reliability. The TORX PLUS® brand drive system is also compatible with the drive tools of its predecessor, the TORX® brand drive system. In contrast to the TORX PLUS® brand drive system, the TORX® brand drive system has a cylindrically-based geometry. The TORX® brand drive system is described and illustrated in U.S. Pat. No. 3,584,667 and the TORX PLUS® brand drive system is described and illustrated in U.S. Pat. Nos. 5,207,132 and 5,279,190. These three United States patents are hereby incorporated by reference in their entireties. Several trademark registrations for the trademarks TORX® and TORX PLUS®, both in the United States and abroad, are owned by Acument Intellectual Properties, LLC, the assignee of the present application.

BRIEF DESCRIPTION OF THE DRAWINGS

The organization and manner of the structure and operation of the invention, together with further objects and advantages thereof, may best be understood by reference to the following description taken in connection with the accompanying drawings Wherein like reference numerals identify like elements in which.

DETAILED DESCRIPTION OF THE INVENTION

Figure 1:
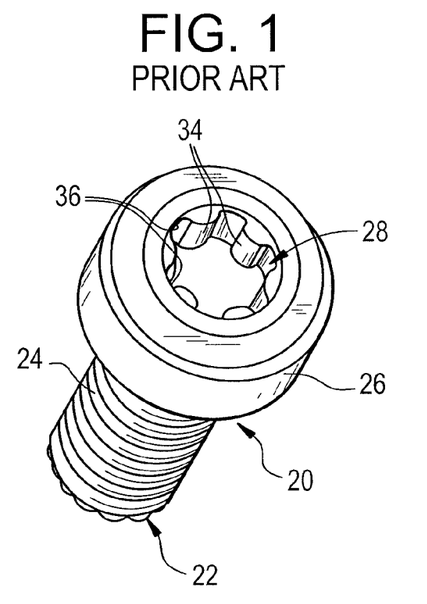
FIG. 1 is a perspective view of a typical, standard-sized TORX PLUS® brand recess fastener.

A typical, standard-sized TORX PLUS® brand recess fastener 20 is illustrated in FIG. 1. The fastener 20 includes an elongate shank 22 having a thread 24 formed thereon. An end of the fastener 20 is provided with an enlarged or headed portion 26 having a recess or drive socket 28 formed therein. The recess or socket 28 has an internal configuration which is defined by a series of alternating, generally elliptically curved lobes 34 and generally elliptically curved flutes 36. The lobes 34 are directed radially inwardly while the flutes 36 are oppositely formed, thus, defining what is referred to hereinafter as the internal configuration of the TORX PLUS® brand drive system. The flutes 36 and lobes 34 are equally spaced around the circumference of the wall of the socket 28 and, in the illustrated embodiment, six series of lobes 34 and flutes 36 are provided.

Figure 2:
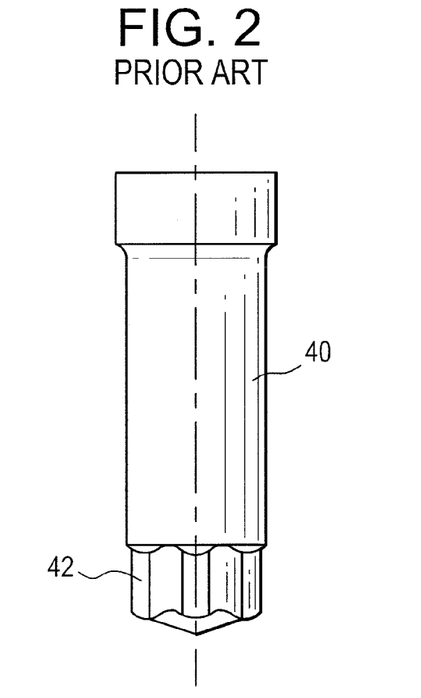
FIG. 2 illustrates a punch pin which is used to fabricate the internal configuration of fastener shown in FIG. 1.
Figure 3:
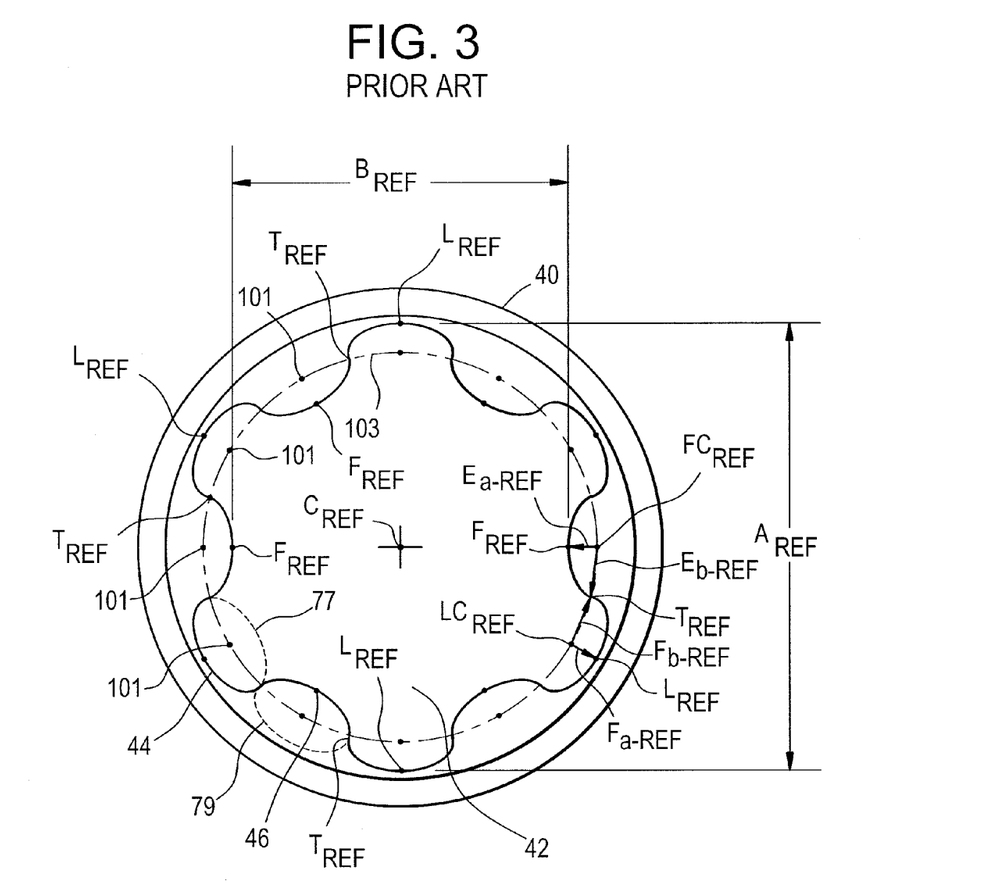
FIG. 3 illustrates a working end surface of the punch pin shown in FIG. 2.

FIG. 2 illustrates a punch pin 40 which is used to fabricate the internal configuration of the socket 28 of the fastener 20. The punch pin 40 is effectively punched into the head 26 of the fastener 20 to form the socket 28 in the head 26 of the fastener 20. FIG. 3 illustrates an end view of the punch pin 40 and shows more clearly the profile of the working end surface 42. More specifically, the punch pin 40 has a series of radially disposed, externally directed lobes 44 which are generally elliptically curved (the remainder of a representative corresponding ellipse being indicated by the dashed line 77 in FIG. 3), and alternating therewith are a corresponding series of generally elliptically curved flutes 46 (the remainder of a representative corresponding ellipse being indicated by the dashed line 79 in FIG. 3). When the working end surface 42 of the punch pin 40 is punched into the head 26 of the fastener 20, the lobes 44 of the punch pin 40 work to form the shape of the flutes 36 of the fastener 20, while the flutes 46 of the punch pin 40 work to form the shape of the lobes 34 of the fastener 20.

As illustrated in FIG. 3, each of the flutes 46 and lobes 44 of the working end surface 42 of the punch pin 40 has a major axis and a minor axis. The major axes of adjacent flutes 46 and lobes 44 are generally tangent at positions $T_{REF}$. The minor axis of each of the lobes 44 generally extends to a position $L_{REF}$ and the minor axis of each of the flutes 46 generally extends to a position $F_{REF}$. A straight line distance from opposite $L_{REF}$ positions of opposite lobes 44, through a center $C_{REF}$, is generally defined as the $A_{REF}$ dimension (i.e., the major diameter) of the working end surface 42 of the punch pin 40. A straight line distance from opposite $F_{REF}$ positions of opposite flutes 46, through the center $C_{REF}$, is generally defined as the $B_{REF}$ dimension (i.e., the minimum diameter) of the working end surface 42 of the punch pin 40. Positions $T_{REF}$ effectively define where each flute 46 intersects an adjacent lobe 44.

A center $LC_{REF}$ of each of the lobes 44 is also defined by where the major and minor axes of each of the lobes 44 intersect. A straight line distance from the center $LC_{REF}$ of the lobe 44 to the position $L_{REF}$ is generally defined as the $F_{a-REF}$ distance. A straight line distance from the center $LC_{REF}$ of the lobe 44 to the position $T_{REF}$ is generally defined as the $F_{b-REF}$ distance. Similarly, a center $FC_{REF}$ of the flutes 46 is defined by where the major and minor axes of the flutes 46 intersect. A straight line distance from the center $FC_{REF}$ of the flute 46 to the position $F_{REF}$ is generally defined as the $E_{a-REF}$ distance. A straight line distance from the center $FC_{REF}$ of the flute 46 to the position. $T_{REF}$ is generally defined as the $E_{b-REF}$ distance.

Additionally, as shown in FIG. 3, the center points 101 of the ellipses 77, 79 that define the shapes of the flutes 46 and lobes 44 form a circle, as indicated by the dashed line 103. The center of the circle 103 is $C_{REF}$.

Figure 4:
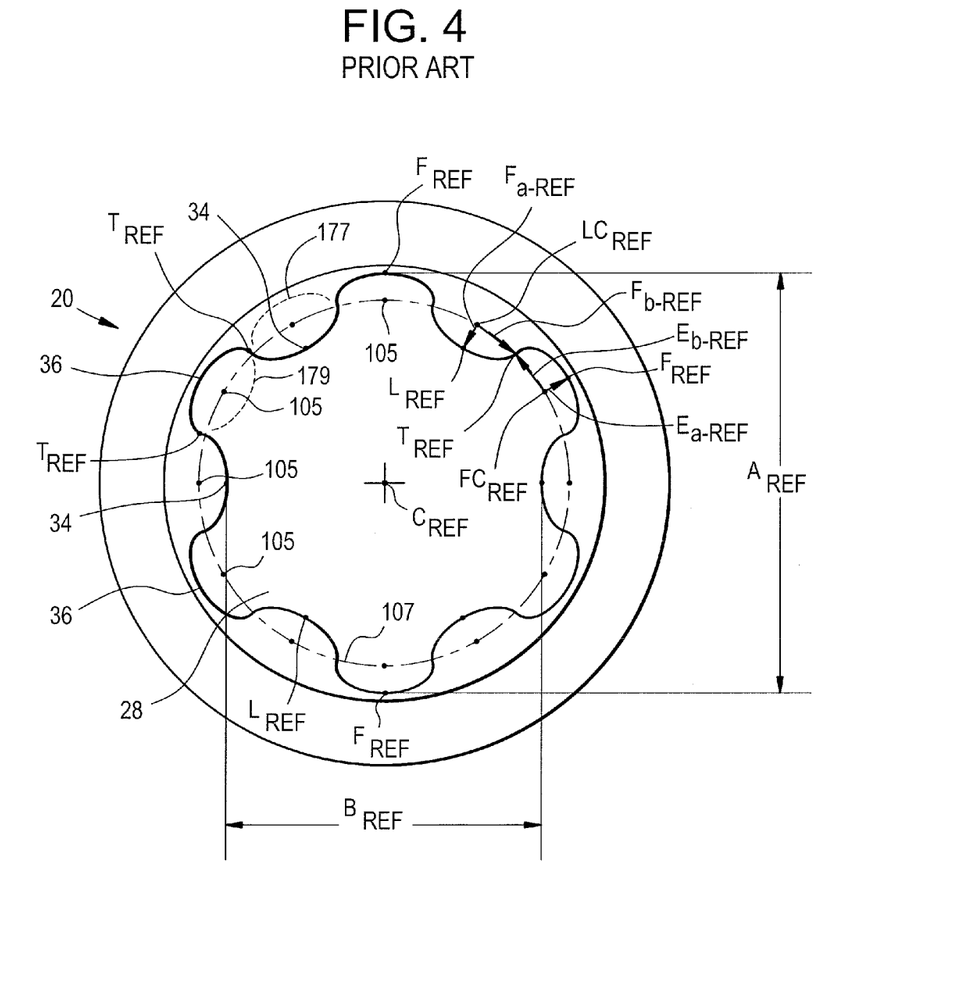
FIG. 4 illustrates a top view of the head of the fastener shown in FIG. 1.

FIG. 4 provides a top view of the head 26 of the fastener 20 shown in FIG. 1. As illustrated in FIG. 4, each of the flutes 36 and lobes 34 of the fastener 20 that are formed by the punch pin 40 have major and minor axes. The major axes of adjacent flutes 36 and lobes 34 are generally tangent at positions $T_{REF}$. The minor axis of each of the lobes 34 generally extends to a position $L_{REF}$ and the minor axis of each of the flutes 36 generally extends to a position $F_{REF}$. A straight line distance from opposite $F_{REF}$ positions of opposite flutes 36, through the center $C_{REF}$, is generally defined as the $A_{REF}$ dimension (i.e., the major diameter) of the socket 28 of the fastener 20. A straight line distance from opposite $L_{REF}$ positions of opposite lobes 34, through the center $C_{REF}$, is generally defined as the $B_{REF}$ dimension (i.e., the minimum diameter) of the socket 28 of the fastener 20.

A center $LC_{REF}$ of each of the lobes 34 is also defined by where the major and minor axes of each of the lobes 34 intersect. A straight line distance from the center $LC_{REF}$ of the lobe 34 to the position $L_{REF}$ is generally defined as the $F_{a-REF}$ distance. A straight line distance from the center $LC_{REF}$ of the lobe 34 to the position $T_{REF}$ is generally defined as the $F_{b-REF}$ distance. Similarly, a center $FC_{REF}$ of the flutes 36 is defined by where the major and minor axes of the flutes 36 intersect. A straight line distance from the center $FC_{REF}$ of the flute 36 to the position $F_{REF}$ is generally defined as the $E_{a-REF}$ distance. A straight line distance from the center $FC_{REF}$ of the flute 36 to the position $T_{REF}$ is generally defined as the $E_{b-REF}$ distance. Positions $T_{REF}$ effectively define where each flute 36 intersects an adjacent lobe 34.

The fastener 20 has a series of lobes 34 which are generally elliptically curved (the remainder of a representative corresponding ellipse being indicated by the dashed line 177 in FIG. 4), and alternating therewith are a corresponding series of generally elliptically curved flutes 36 (the remainder of a representative corresponding ellipse being indicated by the dashed line 179 in FIG. 4). Additionally, similar to the punch pin 40, the fastener 20 provides that the center points 105 of the ellipses 177, 179 that define the shapes of the flutes 36 and lobes 34 form a circle, as indicated by the dashed line 107. The center of the circle is $C_{REF}$.

Figure 5:
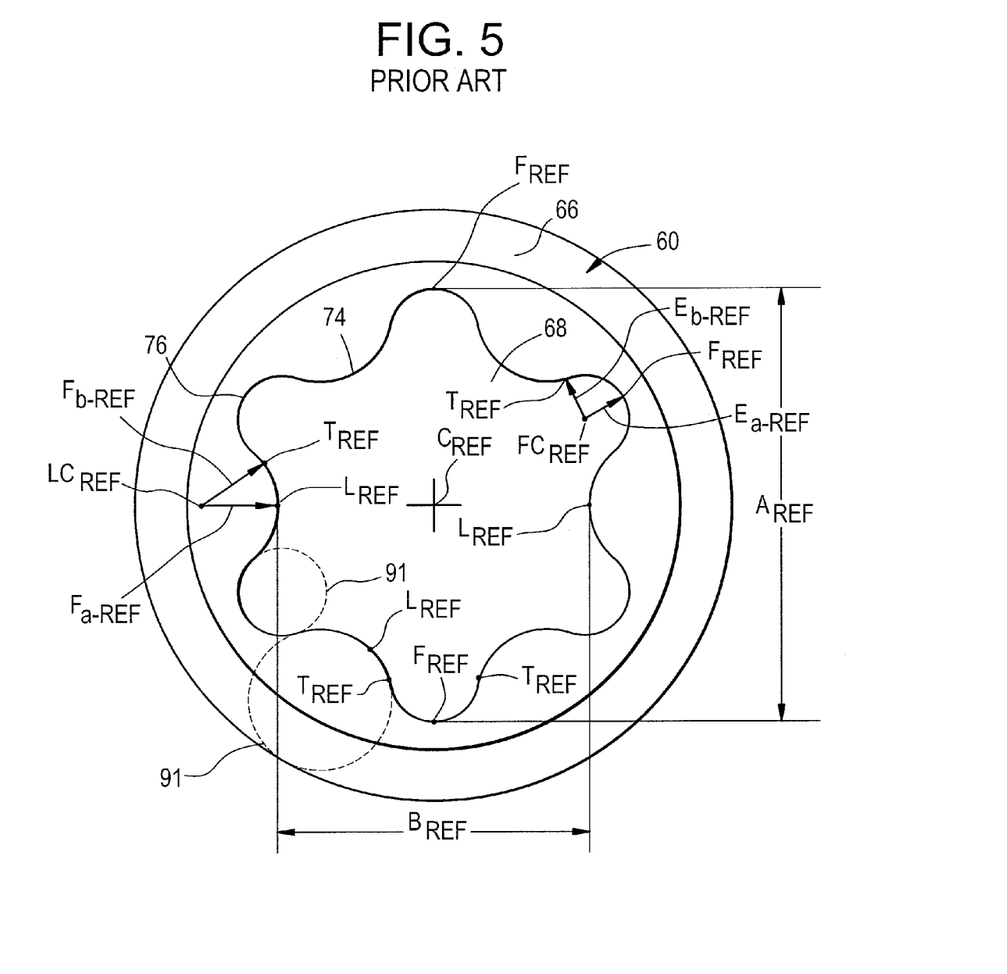
FIG. 5 illustrates a top view of a typical, standard-sized TORX® brand recess fastener.

A typical, standard-sized TORX® brand recess fastener 60 is illustrated in FIG. 5. Like the fastener 20, the fastener 60 includes an elongate shank having a thread formed thereon (although the shank and thread of the fastener 60 are not illustrated, it is to be understood that they are identical to the shank 22 and the thread 24 of the fastener 20). An end of the fastener 60 is provided with an enlarged or headed portion 66 having a recess or drive socket 68 formed therein. The recess or socket 68 has an internal configuration which is defined by a series of alternating, generally cylindrically curved lobes 74 and generally cylindrically curved flutes 76. The lobes 74 are directed radially inwardly while the flutes 76 are oppositely formed, thus, defining what is referred to hereinafter as the internal configuration of the TORX® brand drive system. The flutes 76 and lobes 74 are spaced around the circumference of the wall of the socket 68 and, in the illustrated embodiment, six series of lobes 74 and flutes 76 are provided.

Figure 6:
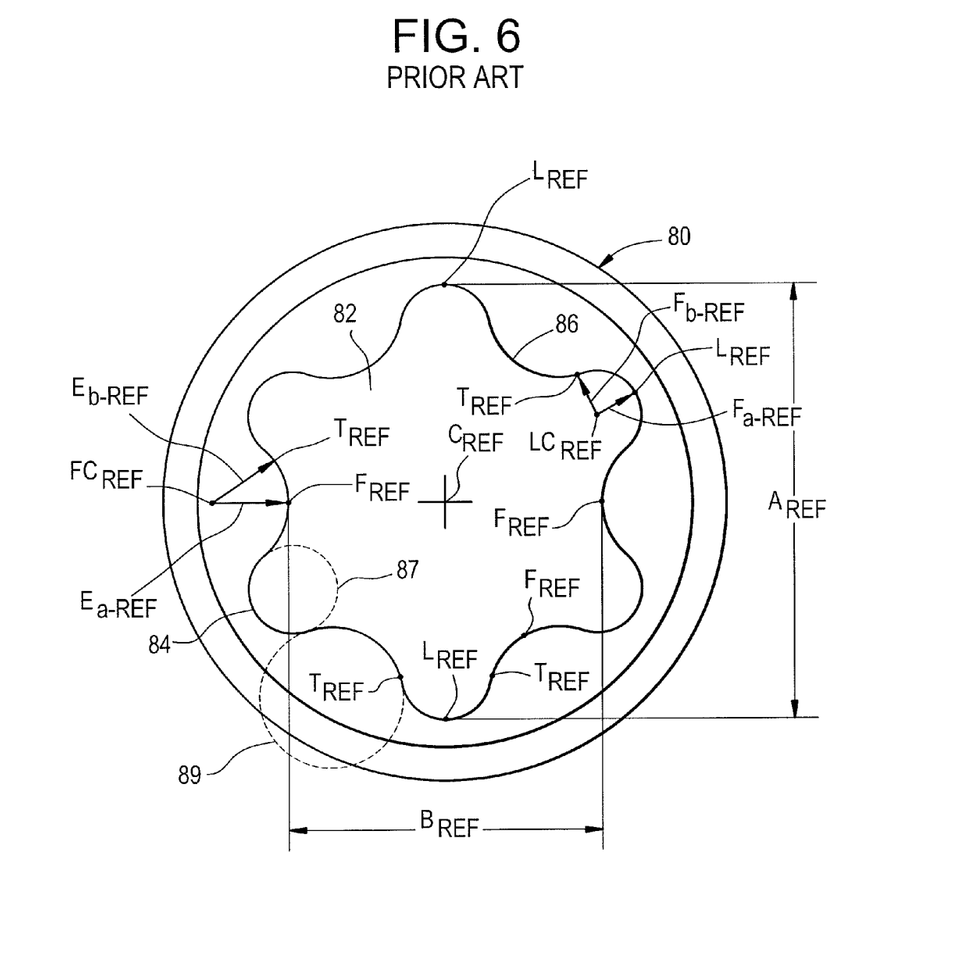
FIG. 6 illustrates an end view of a punch pin which is used to fabricate the internal configuration of the fastener shown in FIG. 5.

FIG. 6 illustrates an end view of a punch pin 80 which is used to fabricate the internal configuration of the socket 68 of the fastener 60, which clearly shows the profile of a working end surface 82. More specifically, the punch pin 80 has a series of radially disposed, externally directed lobes 84 which are generally cylindrically curved (the remainder of a representative cylinder shape being indicated with dashed line 87), and alternating therewith are a corresponding series of generally cylindrically curved flutes 86 (the remainder of a representative cylinder shape being indicated with dashed line 89). When the working end surface 82 of the punch pin 80 is punched into the head of the fastener 60 to form the socket 68, the lobes 84 of the punch pin 80 work to form the shape of the flutes 76 of the fastener 60, while the flutes 86 of the punch pin 80 form the shape of the lobes 74 of the fastener 60.

As illustrated in FIG. 6, each of the flutes 86 and lobes 84 has a major axis and a minor axis. The major axes of adjacent flutes 86 and lobes 84 are generally tangent at positions $T_{REF}$. The minor axis of each of the lobes 84 generally extends to a position $L_{REF}$ and the minor axis of each of the flutes 86 generally extends to a position $F_{REF}$. A straight line distance from opposite $L_{REF}$ positions of opposite lobes 84, through a center $C_{REF}$, is generally defined as the $A_{REF}$ dimension (i.e., the major diameter) of the working end surface 82 of the punch pin 80. A straight line distance from opposite $F_{REF}$ positions of opposite flutes 86, through the center $C_{REF}$, is generally defined as the $B_{REF}$ dimension (i.e., the minimum diameter) of the working end surface 82 of the punch pin 80.

A center $LC_{REF}$ of each of the lobes 84 is also defined by where the major and minor axes of each of the lobes 84 intersect. A straight line distance from the center $LC_{REF}$ of the lobe 84 to the position $L_{REF}$ is generally defined as the $F_{a-REF}$ distance. A straight line distance from the center $LC_{REF}$ of the lobe 84 to the position $T_{REF}$ is generally defined as the $F_{b-REF}$ distance. Similarly, a center $FC_{REF}$ of the flutes 86 is defined by where the major and minor axes of the flutes 86 intersect. A straight line distance from the center $FC_{REF}$ of the flute 86 to the position $F_{REF}$ is generally defined as the $E_{a-REF}$ distance. A straight line distance from the center $FC_{REF}$ of the flute 86 to the position $T_{REF}$ is generally defined as the $E_{b-REF}$ distance. Positions $T_{REF}$ effectively define where each flute 86 intersects an adjacent lobe 84.

It should be pointed out that, as described in U.S. Pat. No. 3,584,667, preferably TORX® brand fasteners have cylindrically curved flutes and lobes. As such, preferably the corresponding flutes 86 and lobes 84 of the punch pin 80 are also cylindrically curved. As such, even though the axes of the flutes 86 and lobes 84 have been described hereinabove as being "major" and "minor," preferably the axes of each lobe 84 are actually generally equal to each other, and preferably the axes of each flute 86 are actually generally equal to each other. In other words, preferably $F_{a\text{-}REF}$ equals $F_{b\text{-}REF}$, and $E_{a\text{-}REF}$ equals $E_{b\text{-}REF}$, while $T_{REF}$ defines the point of demarcation between each flute 86 and lobe 84.

As illustrated in FIG. 5, each of the flutes 76 and lobes 74 of the fastener 60 that are formed by the punch pin 80 also has a major axis and a minor axis. The major axes of adjacent flutes 76 and lobes 74 are generally tangent at positions $T_{REF}$. The minor axis of each of the lobes 74 generally extends to a position $L_{REF}$ and the minor axis of each of the flutes 76 generally extends to a position $F_{REF}$. A straight line distance from opposite $F_{REF}$ positions of opposite flutes 76, through the center $C_{REF}$, is generally defined as the $A_{REF}$ dimension (i.e., the major diameter) of the socket 68 of the fastener 60. A straight line distance from opposite $L_{REF}$ positions of opposite lobes 74, through a center $C_{REF}$, is generally defined as the $B_{REF}$ dimension (i.e., the minimum diameter) of the socket 68 of the fastener 60.

A center $LC_{REF}$ of each of the lobes 74 is also defined by where the major and minor axes of each of the lobes 74 intersect. A straight line distance from the center $LC_{REF}$ of the lobe 74 to the position $L_{REF}$ is generally defined as the $F_{a\text{-}REF}$ distance. A straight line distance from the center $LC_{REF}$ of the lobe 74 to the position $T_{REF}$ is generally defined as the $F_{b\text{-}REF}$ distance. Similarly, a center $FC_{REF}$ of the flutes 76 is defined by where the major and minor axes of the flutes 76 intersect. A straight line distance from the center $FC_{REF}$ of the flute 76 to the position $F_{REF}$ is generally defined as the $E_{a\text{-}REF}$ distance. A straight line distance from the center $FC_{REF}$ of the flute 76 to the position $T_{REF}$ is generally defined as the $E_{b\text{-}REF}$ distance. Positions $T_{REF}$ effectively define where each flute 76 intersects an adjacent lobe 74.

It should be apparent that the size and dimensions of the working end surfaces 42, 82 of the punch pins 40, 80 dictate the size and dimensions of the internal configuration of the sockets 28, 68 of the fasteners 20, 60. As mentioned above, as described in U.S. Pat. No. 3,584,667, preferably TORX® brand fasteners have cylindrically curved flutes and lobes. As such, preferably the flutes 76 and lobes 74 of the punch pin 60 are also cylindrically curved (with the remainder of two representative cylindrical shapes being indicated by the dashed lines 91 in FIG. 5). As such, even though the axes of the flutes 76 and lobes 74 have been described hereinabove as being "major" and "minor," preferably the axes of each lobe 74 are actually generally equal to each other, and preferably the axes of each flute 76 are actually generally equal to each other. In other words, preferably $F_{a\text{-}REF}$ equals $F_{b\text{-}REF}$, and $E_{a\text{-}REF}$ equals $E_{b\text{-}REF}$, while $T_{REF}$ defines the point of demarcation between each flute 76 and lobe 74.

In certain environments, it is necessary for the TORX PLUS® brand recess fasteners 20 and the TORX® brand recess fasteners 60 to have a coating, such as a zinc-flake coating, applied thereto after the internal configuration of the sockets 28, 68 has been formed in the heads 26, 66 of the fasteners 20, 60 by a punch pin (such as by the punch pins 40, 80 shown in FIGS. 3 and 6, respectively). It has been determined that, when some coating, such as a zinc flake coating, is applied to smaller TORX PLUS® brand recess fasteners 20, for example those configured to receive TORX PLUS® brand drivers of sizes 7IP to 10IP (which are known to those of ordinary skill in the art), or to smaller TORX® brand recess fasteners 60, for example those configured to receive TORX® brand drivers of sizes T7 to T10 (which are known to those of ordinary skill in the art), that the coating thickness of the recess wall is not uniform, perhaps due to the coating surface tension caused by a spinning operation. More specifically, the coating is thicker along the flutes 36, 76 than along the lobes 34, 74. This thicker coating along the flutes 36, 76 can cause the flutes 36, 76 to become less deep, thereby resulting in the appropriate drive tool (not shown) or the appropriate measuring gage (which is used to ensure that the internal configurations of the sockets 28, 68 are appropriately sized) not being able to be inserted into the sockets 28, 68 of the fasteners 20, 60.

One possible solution would be to just make a fastener with an oversized socket (i.e., a fastener that has a socket which is oversized in both the $A_{REF}$ and $B_{REF}$ dimensions compared to the standard sizes). However, this would result in driver tools not fitting as well in the sockets of the fasteners. Specifically, the driver tools would be wobbly in the internal configuration of the sockets of the fasteners during use, which is not preferred.

As such, there is a need for a solution which overcomes the disadvantages of the prior art smaller TORX PLUS® brand recess fasteners and the prior art smaller TORX® brand recess fasteners which have had a coating, such as a zinc-flake coating, applied thereto. The present invention provides such a solution.

DETAILED DESCRIPTION OF THE ILLUSTRATED EMBODIMENTS

While the invention may be susceptible to embodiment in different forms, there are shown in the drawings, and herein will be described in detail, specific embodiments with the understanding that the present disclosure is to be considered an exemplification of the principles of the invention, and is not intended to limit the invention to that as illustrated and described herein.

Figure 7:
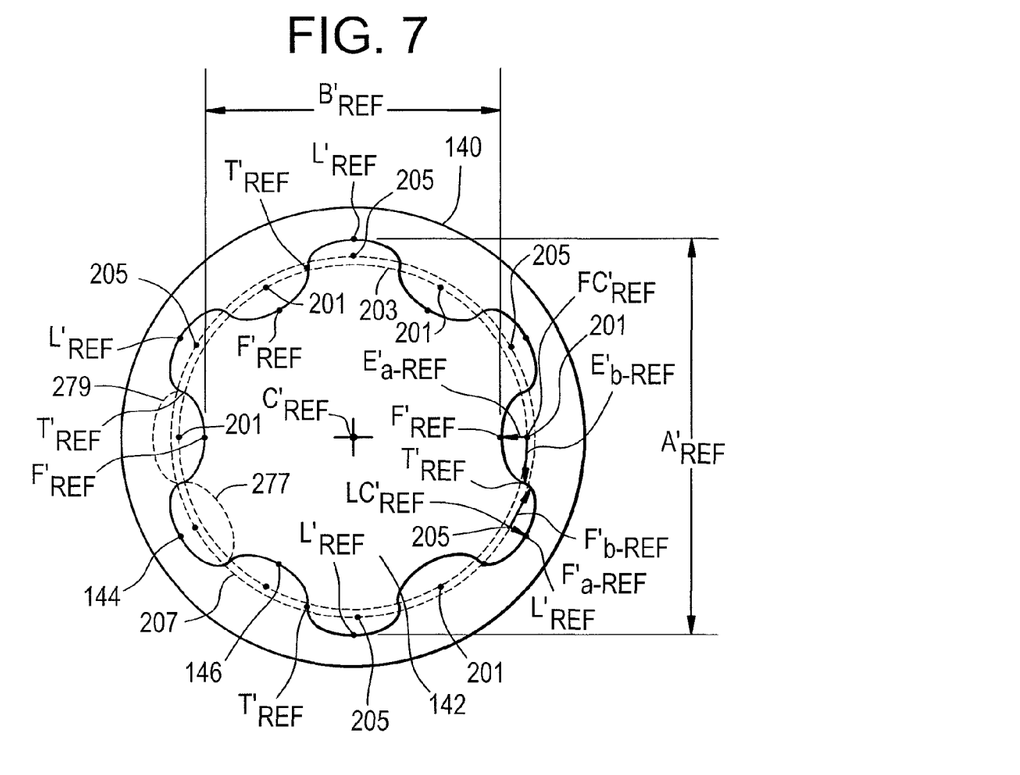
FIG. 7 illustrates a working end surface of a punch pin which is in accordance with an embodiment of the present invention.

FIG. 7 illustrates a working end surface 142 of a punch pin 140 which is in accordance with an embodiment of the present invention. The punch pin 140 is used to fabricate the internal configuration of a socket to be formed in smaller-sized (typically 7IP to 10IP) TORX PLUS® recess fasteners 120. Like the punch pin 40 of the prior art, the punch pin 140 comprises a series of radially disposed, externally directed lobes 144 which are generally elliptically curved (the remainder of a representative corresponding ellipse being indicated by the dashed line 277 in FIG. 7), and alternating therewith are a corresponding series of generally elliptically curved flutes 146 (the remainder of a representative corresponding ellipse being indicated by the dashed line 279 in FIG. 7).

As illustrated in FIG. 7, each of the flutes 146 and lobes 144 of the punch pin 140 have major and minor axes. The major axes of adjacent flutes 146 and lobes 144 are generally tangent at positions $T'_{REF}$. The minor axis of each of the lobes 144 generally extends to a position $L'_{REF}$ and the minor axis of each of the flutes 146 generally extends to a position $F'_{REF}$. A straight line distance from opposite $L'_{REF}$ positions of opposite lobes 144, through a center $C'_{REF}$, is generally defined as the $A'_{REF}$ dimension of the working end surface 142 of the punch pin 140. A straight line distance from opposite $F'_{REF}$ positions of opposite flutes 146, through the center C'$_{REF}$, is generally defined as the B'$_{REF}$ dimension of the working end surface 142 of the punch pin 140.

A center LC'$_{REF}$ of each of the lobes 144 is also defined by where the major and minor axes of each of the lobes 144 intersect. A straight line distance from the center LC'$_{REF}$ of the lobe 144 to the position L'$_{REF}$ is generally defined as the F'$_{a-REF}$ distance. A straight line distance from the center LC'$_{REF}$ of the lobe 144 to the position T'$_{REF}$ is generally defined as the F'$_{b-REF}$ distance. Similarly, a center FC'$_{REF}$ of the flutes 146 is defined by where the major and minor axes of the flutes 146 intersect. A straight line distance from the center FC'$_{REF}$ of the flute 146 to the position F'$_{REF}$ is generally defined as the E'$_{a-REF}$ distance. A straight line distance from the center FC'$_{REF}$ of the flute 146 to the position T'$_{REF}$ is generally defined as the E'$_{b-REF}$ distance.

The differences between the punch pin 140 of the present invention and the standard-sized punch pin 40 of the prior art are: (1) the differences between F'$_{a-REF}$ and F$_{a-REF}$ distances; (2) the differences between F'$_{b-REF}$ and F$_{b-REF}$ distances; (3) the differences between E'$_{b-REF}$ and E$_{b-REF}$ distances; and (4) the resultant differences between A'$_{REF}$ and A$_{REF}$ distances. More specifically, in the preferred embodiment, the F'$_{a-REF}$ distance is preferably 0.025 mm larger than the F$_{a-REF}$ distance, the F'$_{b-REF}$ distance is preferably 0.025 mm larger than the F$_{b-REF}$ distance, the E'$_{b-REF}$ distance is preferably 0.025 mm smaller than the E$_{b-REF}$ distance, and the A'$_{REF}$ distance is preferably 0.05 mm larger than the A$_{REF}$ distance. There are no necessary changes made to the other dimensions of the punch pins 40, 140. For example, the B'$_{REF}$ and B$_{REF}$ distances are preferably the same, and the E'$_{a-REF}$ and E$_{a-REF}$ dimensions are preferably the same. For reference purposes, FIG. 8 illustrates a comparison of the working end surface 142 of the punch pin 140 compared to the working end surface 42 of the punch pin 40.

As shown in FIG. 7, due to the E'$_{b-REF}$ distance being made smaller in relation to the E'$_{a-REF}$ distance, the ellipses 279 which form the flutes 146 become less oblong (i.e., become closer to being cylindrical), and are preferably less oblong than the ellipses 277 which form the lobes 144. Additionally, while the center points 201 of the ellipses 279 that define the shapes of the flutes 146 form one circle (as indicated by dashed line 203), the center points 205 of the ellipses 279 that define the shapes of the lobes 144 form another circle (as defined by the dashed line 207) which is further away from the central axis C'$_{REF}$ than the circle 203.

Figure 8:
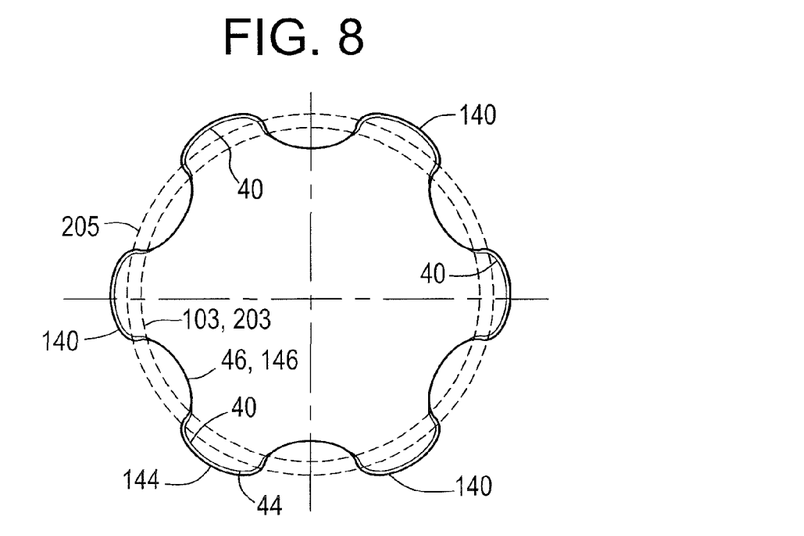
FIG. 8 illustrates a comparison of the working end surface of the punch pin shown in FIG. 7 compared to the working end surface of the punch pin Shown in FIG. 2.

As mentioned, FIG. 8 illustrates a comparison of the working end surface 142 of the punch pin 140 compared to the working end surface 42 of the punch pin 40. As shown, while the center points of the lobes 44 and flutes 46 of the punch pin 40 are along the same circle 103, and the center points of the flutes 146 of the punch pin 140 are along a very similar circle 203, the center points of the lobes 144 of the punch pin 140 are along a different circle 205, a circle 205 which is further away from the center axis. The lobes 144 of the punch pin 140 extend further away from the center axis than do the lobes 44 of punch pin 40, yet the flutes 146 of the punch pin 140 extend no further radially inward, toward the center axis, than do the flutes 46 of the punch pin 40.

As will be described, the fact that the flutes 146 of the punch pin 140 are less oblong (i.e., the flutes 146 are less concave) while the lobes 144 of the punch pin 140 are effectively moved further away from the central axis C'$_{REF}$, provides that the resulting flutes 136 which are punched into the head of the fastener 120 can be provided as being deeper than they otherwise would be, without having to provide corresponding lobes 134 which extend further toward the center axis C'$_{REF}$ of the fastener. As will be described, this extra deepness in the flutes 136 helps to provide extra room for a coating, such as a zinc-flake coating, to deposit.

Figure 9:
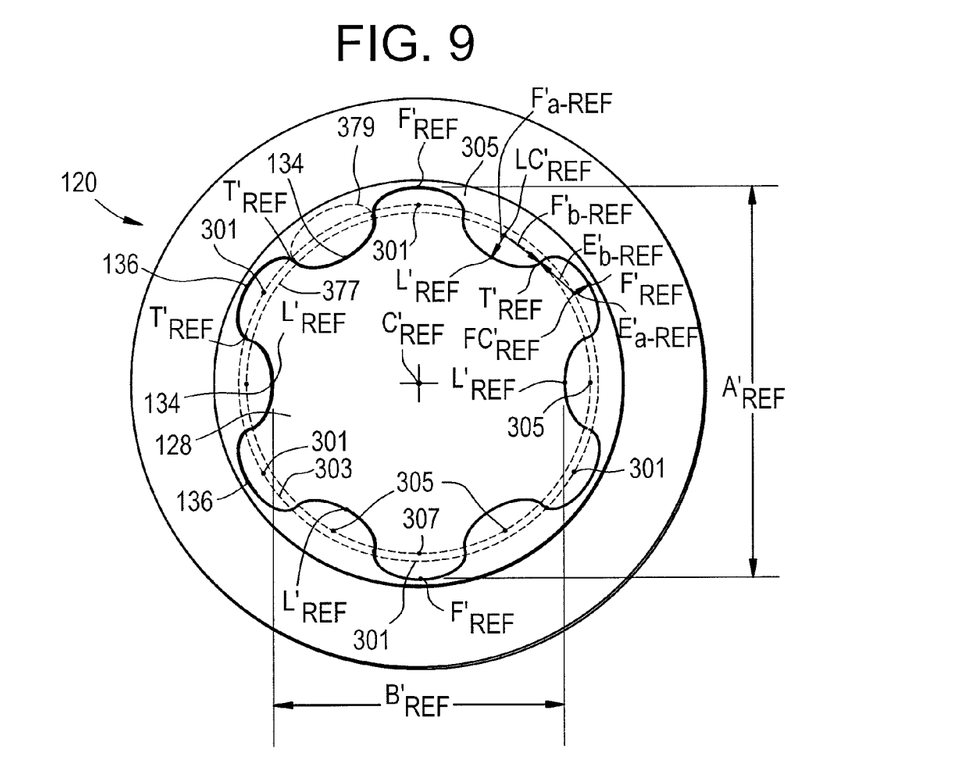
FIG. 9 illustrates a top view of a typical, smaller-sized TORX PLUS® brand recess fastener.

The punch pin 140 is then used to fabricate the internal configuration of the socket 128 of smaller-sized TORX PLUS® brand recess fasteners 120 (see FIG. 9). More specifically, the working end surface 142 is driven, or punched, into the head of the fastener 120 to form socket 128. As a result, the lobes 144 of the punch pin 140 form the shape of the flutes 136 of the fastener 120, while the flutes 146 of the punch pin 140 form the shape of the lobes 134 of the fastener 120. Due to the change in the working end surface 142 of the punch pin 140, the resultant internal configuration of the socket 128 of the smaller-sized TORX PLUS® brand recess fasteners 120 will also change in a commensurate manner.

As illustrated in FIG. 9, each of the flutes 136 and lobes 134 of the fastener 120 that are formed by the punch pin 140 have major and minor axes. The major axes of adjacent flutes 136 and lobes 134 are generally tangent at positions T'$_{REF}$. The minor axis of each of the lobes 134 generally extends to a position L'$_{REF}$ and the minor axis of each of the flutes 136 generally extends to a position F'$_{REF}$. A straight line distance from opposite F'$_{REF}$ positions of opposite flutes 136, through the center C'$_{REF}$, is generally defined as the A'$_{REF}$ dimension (i.e., the major diameter) of the socket 128 of the fastener 120. A straight line distance from opposite L'$_{REF}$ positions of opposite lobes 134, through a center C'$_{REF}$, is generally defined as the B'$_{REF}$ dimension (i.e., the minimum diameter) of the socket 128 of the fastener 120.

A center LC'$_{REF}$ of each of the lobes 134 is also defined by where the major and minor axes of each of the lobes 134 intersect. A straight line distance from the center LC'$_{REF}$ of the lobe 134 to the position L'$_{REF}$ is generally defined as the F'$_{a-REF}$ distance. A straight line distance from the center LC'$_{REF}$ of the lobe 134 to the position T'$_{REF}$ is generally defined as the F'$_{b-REF}$ distance. Similarly, a center FC'$_{REF}$ of the flutes 136 is defined by where the major and minor axes of the flutes 136 intersect. A straight line distance from the center FC'$_{REF}$ of the flute 136 to the position F'$_{REF}$ is generally defined as the E'$_{a-REF}$ distance. A straight line distance from the center FC'$_{REF}$ of the flute 136 to the position T'$_{REF}$ is generally defined as the E'$_{b-REF}$ distance.

The differences between the fastener 120 of the present invention and the fastener 20 of the prior art are: (1) the difference between E'$_{a-REF}$ and E$_{a-REF}$ distances; (2) the difference between E'$_{b-REF}$ and E$_{b-REF}$ distances; (3) the difference between F'$_{b-REF}$ and F$_{b-REF}$ distances; and (4) the difference between A'$_{REF}$ and A$_{REF}$ distances. More specifically, in the preferred embodiment, the E'$_{a-REF}$ distance is preferably 0.025 mm larger than the E$_{a-REF}$ distance, the E'$_{b-REF}$ distance is preferably 0.025 ram larger than the E$_{b-REF}$ distance, the F'$_{b-REF}$ distance is preferably 0.025 mm smaller than the F$_{b-REF}$ distance, and the A'$_{REF}$ distance is preferably 0.05mm larger than the A$_{REF}$ distance. There are no necessary changes made to the other dimensions of the fasteners 20, 120. For example, the B'$_{REF}$ and B$_{REF}$ distances are preferably the same, and the F'$_{a-REF}$ and F$_{a-REF}$ dimensions are preferably the same. For reference purposes, FIG. 10 illustrates a comparison of the socket 128 of the fastener 120 compared to the socket 28 of the fastener 20.

As shown in FIG. 9, due to the F$_{b-REF}$ distance being made smaller in relation to the F'$_{a-REF}$ distance, the ellipses 379 which form the lobes 134 become less oblong (i.e., become closer to being cylindrical), and are preferably less oblong than the ellipses 377 which form the flutes 136. Additionally, while the center points 301 of the ellipses 377 that define the shapes of the flutes 136 form one circle (as indicated by dashed line 303), the center points 305 of the ellipses 379 that define the shapes of the lobes 134 form another circle (as defined by the dashed line 307), and circle 305 is closer to the central axis $C'_{REF}$ than is circle 303.

Figure 10:
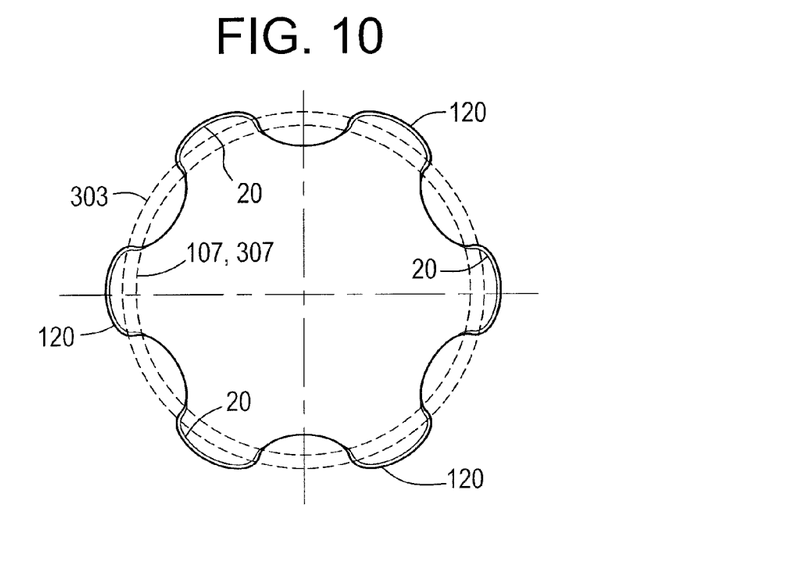
FIG. 10 illustrates a comparison of the socket of the fastener shown in FIG. 9 compared to the socket of the fastener shown in FIG. 1.

As mentioned, FIG. 10 illustrates a comparison of the socket 128 of the fastener 120 compared to the socket 28 of fastener 20. As shown, while the center points of the lobes 34 and flutes 36 of the socket 28 of fastener 20 are along the same circle 107, and the center points of the lobes 134 of the socket 128 of the fastener 120 are along a very similar circle 307, the center points of the flutes 136 of the socket 128 of the fastener 120 are along a different circle 303, a circle 303 which is further away from the center axis. The flutes 136 of the socket 128 extend further away from the center axis than do the flutes 36 of socket 28, yet the lobes 134 of the socket 128 extend no further radially inward, toward the center axis, than do the lobes 34 of the socket 28.

The fact that the ellipses 379 which form the lobes 134 are provided as being less oblong while the ellipses 377 which form the flutes 136 are moved further away from the center axis $C'_{REF}$ provides that the flutes 136 can be provided as being deeper, while not having to provide that the lobes 134 extend further toward the center axis $C'_{REF}$. This extra deepness in the flutes 136 helps to provide extra room for a coating, such as a zinc-flake coating, to deposit.

Thus, when the zinc-flake coating is applied to smaller TORX PLUS® brand recess fasteners 120 formed by the punch pin 140, the flutes 136 are deeper but the lobes 134 are not closer to the center axis $C'_{REF}$. As a result, the fact that the coating is thicker along the flutes 136 than along the lobes 134 no longer causes any problems with regard to the use of either an appropriate drive tool or an appropriate measuring gage.

The increase in the $A'_{REF}$ dimension of the punch pin 140 works to form an increase in the $A'_{REF}$ dimension of the fastener 120, thus taking into account and solving the problem associated with the zinc-flake coating process, without creating other problems for the fastener 120 formed by the punch pin 140, such that the driver tools and the appropriate measurement gages can be used on the fasteners despite the increased thickness of the coating within the flutes 136.

Figure 11:
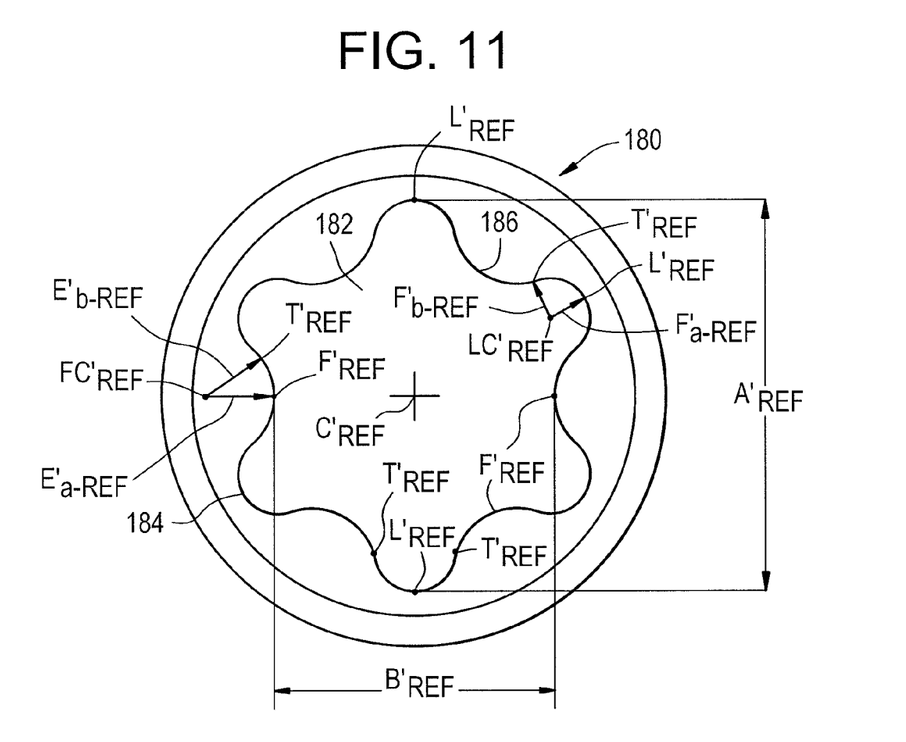
FIG. 11 illustrates a working end surface of a punch pin which is in accordance with an embodiment of the present invention.

FIG. 11 illustrates a working end surface 182 of a punch pin 180 which is in accordance with an embodiment of the present invention. The punch pin 180 is used to fabricate the internal configuration of a socket to be formed in smaller-sized (typically T7 to T10) TORX® recess fasteners 160 (see FIG. 13). Like the punch pin 80 of the prior art, the punch pin 180 comprises a series of radially disposed, externally directed lobes 184 and flutes 186.

As illustrated in FIG. 11, each of the flutes 186 and lobes 184 of the punch pin 180 has a major axis and a minor axis. The major axes of adjacent flutes 186 and lobes 184 are generally tangent at positions $T'_{REF}$. The minor axis of each of the lobes 184 generally extends to a position $L'_{REF}$ and the minor axis of each of the flutes 186 generally extends to a position $F'_{REF}$. A straight line distance from opposite $L'_{REF}$ positions of opposite lobes 184, through a center $C'_{REF}$ is generally defined as the $A'_{REF}$ dimension (i.e., the major diameter) of the working end surface 182 of the punch pin 180. A straight line distance from opposite $F'_{REF}$ positions of opposite flutes 186, through the center $C'_{REF}$, is generally defined as the $B'_{REF}$ dimension (i.e., the minimum diameter) of the working end surface 182 of the punch pin 180.

A center $LC'_{REF}$ of each of the lobes 184 is also defined by Where the major and minor axes of each of the lobes 184 intersect. A straight line distance from the center $LC'_{REF}$ of the lobe 184 to the position. $L'_{REF}$ is generally defined as the $F'_{a\text{-}REF}$ distance. A straight line distance from the center $LC'_{REF}$ of the lobe 184 to the position $T'_{REF}$ is generally defined as the $F'_{b\text{-}REF}$ distance. Similarly, a center $FC'_{REF}$ of the flutes 186 is defined by where the major and minor axes of the flutes 186 intersect. A straight line distance from the center $FC'_{REF}$ of the flute 186 to the position $F'_{REF}$ is generally defined as the $E'_{a\text{-}REF}$ distance. A straight line distance from the center $FC'_{REF}$ of the flute 186 to the position $T'_{REF}$ is generally defined as the $E'_{b\text{-}REF}$ distance.

The differences between the punch pin 180 of the present invention and the standard-sized punch pin 80 of the prior art are: (1) the difference between $F'_{a\text{-}REF}$ and $F_{a\text{-}REF}$ distances; (2) the difference between $F'_{b\text{-}REF}$ and $F_{b\text{-}REF}$ distances; (3) the difference between $E'_{b\text{-}REF}$ and $E_{b\text{-}REF}$ distances; and (4) the difference between $A'_{REF}$ and $A_{REF}$ distances. More specifically, in the preferred embodiment, the $F'_{a\text{-}REF}$ distance is preferably 0.025 mm larger than the $F_{a\text{-}REF}$ distance, the $F'_{b\text{-}REF}$ distance is preferably 0.025 mm larger than the $F_{b\text{-}REF}$ distance, the $E'_{b\text{-}REF}$ distance is preferably 0.025 mm smaller than the $E_{b\text{-}REF}$ distance, and the $A'_{REF}$ distance is preferably 0.05 mm larger than the $A_{REF}$ distance. There are no necessary changes made to the other dimensions of the punch pins 80, 180. For example, preferably the $B'_{REF}$ distance and the $B_{REF}$ distance are the same, and the $E'_{a\text{-}REF}$ and $E_{a\text{-}REF}$ distances are the same. For reference purposes, FIG. 12 illustrates a comparison of the working end surface 182 of the punch pin 180 compared to the working end surface 82 of the punch pin 80.

Even though the axes of the lobes 184 have been described hereinabove as being "major" and "minor," preferably the axes are actually generally equal to each other. In other words, preferably $F'_{a\text{-}REF}$ equals $F'_{b\text{-}REF}$. While the $F'_{a\text{-}REF}$ and the $F'_{b\text{-}REF}$ dimensions are preferably equal to each other, thereby providing the working end surface 182 of the punch pin 180 with generally cylindrically curved lobes 184 and flutes 186.

Figure 12:
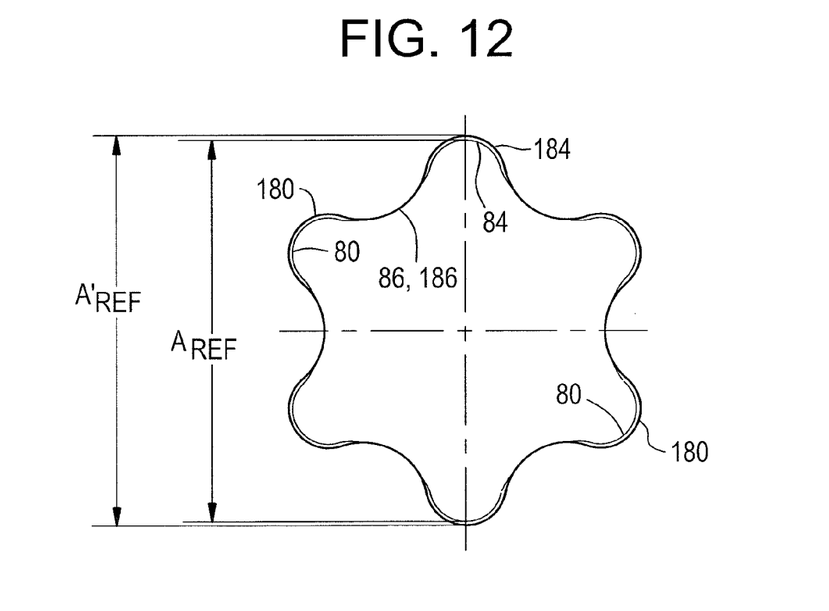
FIG. 12 illustrates a comparison of the working end surface of the punch pin shown in FIG. 11 compared to the working end surface of the punch pin shown in FIG. 6.

As mentioned, FIG. 12 illustrates a comparison of the working end surface 182 of the punch pin 180 compared to the working end surface 82 of the punch pin 80. As shown, the lobes 184 of the punch pin 180 extend further away from the center axis than do the lobes 84 of punch pin 80, yet the flutes 186 of the punch pin 180 extend no further radially inward, toward the center axis, than do the flutes 86 of the punch pin 80. This provides that the resulting flutes 176 which are punched into the head of the fastener 180 are provided as being deeper than they otherwise would be, without having to provide corresponding lobes 174 which extend further toward the center axis $C'_{REF}$ of the fastener. As will be described, this extra deepness in the flutes 176 helps to provide extra room for a coating, such as a zinc-flake coating, to deposit.

The punch pin 180 is then used to fabricate the internal configuration of the socket 168 of smaller-sized TORX® brand recess fasteners 160. More specifically, the working end surface 182 is driven, or punched, into the head of a fastener 160 (see FIG. 13), As a result, the lobes 184 of the punch pin 180 form the shape of the flutes 176 of the fastener 160, while the flutes 186 of the punch pin 180 form the shape of the lobes 174 of the fastener 160. Due to the change in the working end surface 182 of the punch pin 180, the resultant internal configuration of the socket 168 of the smaller-sized TORX® brand recess fasteners 160 will also change in a commensurate manner.

Figure 13:
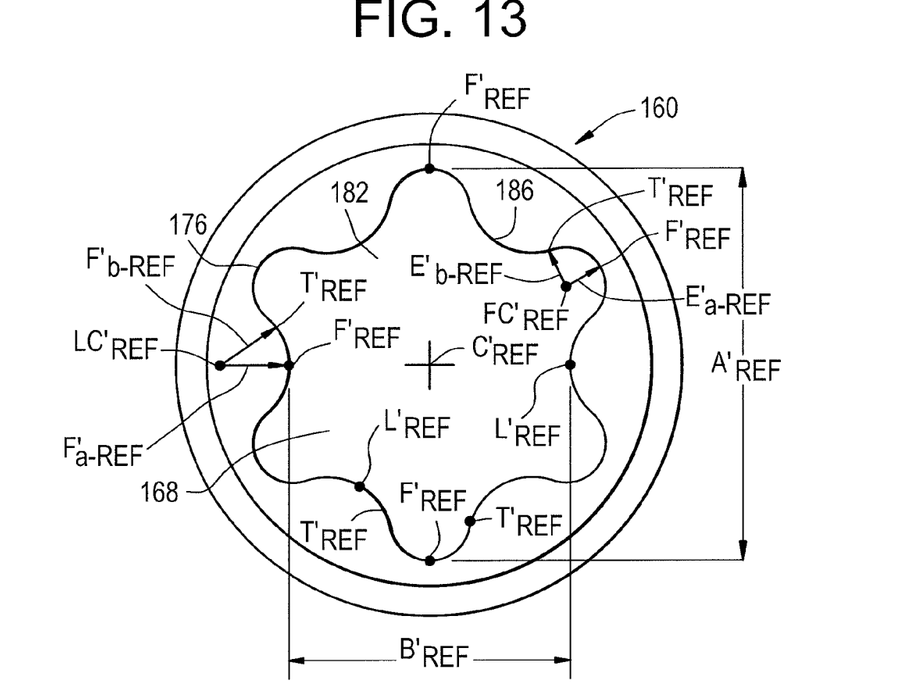
FIG. 13 illustrates a top view of a smaller-sized (typically T7 to T10) TORX® recess fastener.

As illustrated in FIG. 13, each of the flutes 176 and lobes 174 of the fastener 160 that are formed by the punch pin 180 have major and minor axes. The major axes of adjacent flutes 176 and lobes 174 are generally tangent at positions $T'_{REF}$. The minor axis of each of the lobes 174 generally extends to a position $L'_{REF}$ and the minor axis of each of the flutes 176 generally extends to a position $F'_{REF}$. A straight line distance from opposite $F''_{REF}$ positions of opposite flutes 176, through the center $C'_{REF}$, is generally defined as the $A'_{REF}$ dimension (i.e., the major diameter) of the socket 168 of the fastener 160. A straight line distance from opposite $L'_{REF}$ positions of opposite lobes 174, through a center $C'_{REF}$, is generally defined as the $B'_{REF}$ dimension (i.e., the minimum diameter) of the socket 168 of the fastener 160.

A center $LC'_{REF}$ of each of the lobes 174 is also defined by where the major and minor axes of each of the lobes 174 intersect, A straight line distance from the center $FC'_{REF}$ of the lobe 174 to the position. $L'_{REF}$ is generally defined as the $F'_{a-REF}$ distance. A straight line distance from the center $LC'_{REF}$ of the lobe 174 to the position $T'_{REF}$ is generally defined as the $F'_{b-REF}$ distance. Similarly, a center $FC'_{REF}$ of the flutes 176 is defined by where the major and minor axes of the flutes 176 intersect. A straight line distance from the center $FC'_{REF}$ of the flute 176 to the position $F'_{REF}$ is generally defined as the $E'_{a-REF}$ distance. A straight line distance from the flute center $FC'_{REF}$ of the flute 176 to the position $T'_{REF}$ is generally defined as the $E'_{b-REF}$ distance.

The differences between the fastener 160 of the present invention and the fastener 60 of the prior art are: (1) the difference between $E'_{a-REF}$ and $E_{a-REF}$ distances; (2) the difference between $E'_{b-REF}$ and $E_{b-REF}$ distances; (3) the difference between $F'_{b-REF}$ and $F_{b-REF}$ distances; and (4) the difference between $A'_{REF}$ and $A_{REF}$ distances. More specifically, in the preferred embodiment, the $E'_{a-REF}$ distance is preferably 0.025 mm larger than the $E_{a-REF}$ distance, the $E'_{b-REF}$ distance is preferably 0.025 mm larger than the $E_{b-REF}$ distance, the $F'_{b-REF}$ distance is preferably 0.025 mm smaller than the $F_{b-REF}$ distance, and the $A'_{REF}$ distance is preferably 0.05mm larger than the $A_{REF}$ distance. There are no necessary changes made to the other dimensions of the fasteners 60, 160. For example, preferably the $B'_{REF}$ and $B_{REF}$ distances are the same, and the $F'_{a-REF}$ and $F_{a-REF}$ dimensions are preferably the same. For reference purposes, FIG. 14 illustrates a comparison of the socket 168 of the fastener 160 compared to the socket 68 of the fastener 60.

Even though the axes of the flutes 176 have been described hereinabove as being "major" and "minor," preferably the axes are actually generally equal to each other. In other words, preferably $E'_{a-REF}$ equals $E'_{b-REF}$).

Figure 14:
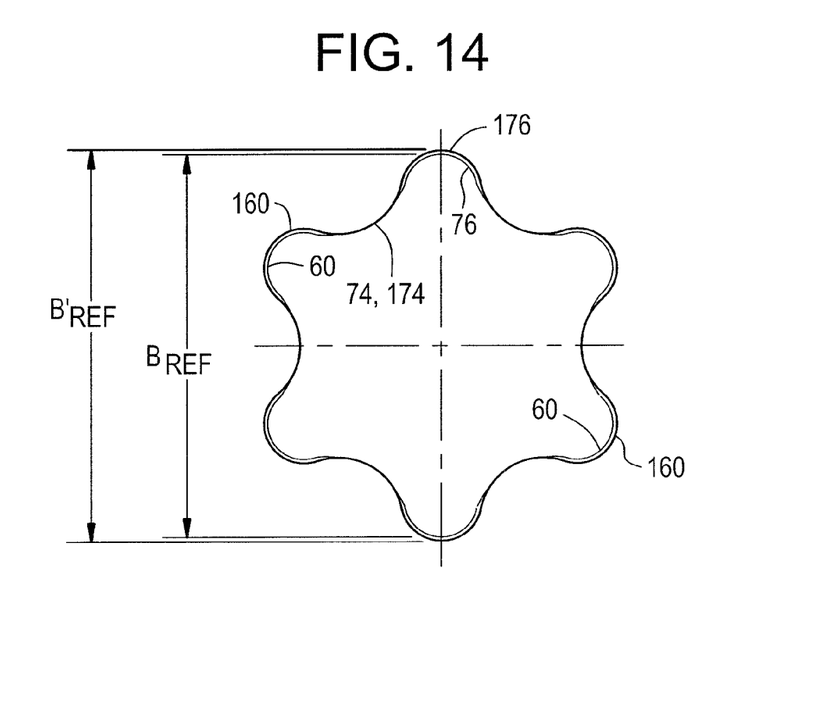
FIG. 14 illustrates a comparison of the socket of the fastener shown in FIG. 13 compared to the socket of the fastener shown in FIG. 5.

As mentioned, FIG. 14 illustrates a comparison of the socket 168 of fastener 160 compared to the socket 68 of fastener 60. As shown, the flutes 176 of socket 168 extend further away from the center axis than do the flutes 76 of socket 68, yet the lobes 174 of socket 168 extend no further radially inward, toward the center axis, than do the lobes 74 of the socket 68.

The flutes 176 are provided as being deeper than they otherwise would be, without having to provide corresponding lobes 174 which extend further toward the center axis $C'_{REF}$ of the fastener 160. This extra deepness in the flutes 176 helps to provide extra room for a coating, such as a zinc-flake coating, to deposit. Thus, the fact that the coating is thicker along the flutes 176 than along the lobes 174 no longer causes any problems with regard to the use of either an appropriate drive tool or an appropriate measuring gage.

The increase in the $A'_{REF}$ dimension of the punch pin 180 works to form an increase in the $A'_{REF}$ dimension of the fastener 160, thus taking into account and solving the problem associated with the zinc-flake coating process, without creating other problems for the fastener 160 formed by the punch pin 180, such that the driver tools and the appropriate measurement gages can be used on the fasteners despite the increased thickness of the coating within the flutes 176.

While U.S. Pat. No. 3,584,667 effectively discloses the major diameter (identified with reference numeral 25 in the '667 patent) as being 25-30% larger than the minimum diameter (identified with reference numeral 26 in the '667 patent), preferably an embodiment of the present invention (whether embodied as a fastener or as a punch pin see FIGS. 11 and 13) provides that the major diameter (i.e., the $A'_{REF}$ dimension) is at least 40% greater than (in other words, is 140% of) the minimum diameter (i.e., the $B'_{REF}$ dimension), and is even more preferably between 42% and 49% larger than (in other words, is between 142% and 149% of the minimum diameter (i.e., the $B'_{REF}$ dimension). By providing that the $A'_{REF}$ dimension is that much larger than the $B'_{REF}$ dimension compared to what is disclosed in the '667 patent, the present invention provides that the fasteners have sockets which are better suited to receive a coating, such as a zinc-flake coating, and have more favorable tolerances thereafter.

While the invention is described in connection with the TORX PLUS® and TORX® brand drive systems, it is envisioned that the invention would also apply equally to other drive systems, such as other straight wall drive systems. As such, the present invention need not necessarily be embodied in a structure that has alternating flutes and lobes, so long as the structure has some type of alternating surfaces. Regardless, preferably an apparatus which is in accordance with the present invention has alternating structures, and those structures define a major diameter or dimension (i.e., "A") and a minimum or minor diameter or dimension (i.e., "B"), and preferably the A dimension is oversized such that the apparatus is better suited to accept a coating and remain within acceptable, final tolerances. The A dimension could be, for example at least 40 percent greater than the B dimension. Preferably, the A dimension is more like 42-49 percent greater than the B dimension, and may even be more like 46-49 percent greater than the B dimension.

It is to be understood that the drawings herein are not drawn to scale.

While preferred embodiments of the present invention are shown and described, it is envisioned that those skilled in the art may devise various modifications of the present invention without departing from the spirit and scope of the invention.

The invention is claimed as follows:

1. A punch pin having a working end surface, wherein either the working end surface comprises a plurality of alternating structures, said alternating structures having a major diameter extending between a first set of opposing structures, and a minimum diameter extending between a second set of opposing structures, wherein the major diameter is at least 42-49% larger than the minimum diameter.

2. A punch pin as recited in claim 1, wherein the major diameter is at least 46-49% larger than the minimum diameter.

3. A punch pin as recited in claim 1, said working end surface comprising a plurality of lobes and a plurality of flutes, wherein each of the flutes and lobes is elliptically curved, wherein center points of the ellipses which define the flutes define a first circle, wherein center points of the ellipses which define the lobes define a second circle, wherein the second circle is larger than the first circle, and wherein said first circle is closer to a center axis of the punch pin than is said second circle.

4. A punch pin as recited in claim 3, wherein the ellipses which define the flutes are less oblong than are the ellipses which define the lobes.

5. A fastener having a socket formed therein, wherein the socket comprises a plurality of alternating structures, said alternating structures having a major diameter extending between a first set of opposing structures, and a minimum diameter extending between a second set of opposing structures, wherein the major diameter is at least 42-49% larger than the minimum diameter.

6. A fastener as recited in claim 5, wherein the major diameter is at least 46-49% larger than the minimum diameter.

7. A fastener as recited in claim 5, said socket comprising a plurality of lobes and a plurality of flutes, said socket having a major diameter extending between opposing flutes and a minimum diameter extending between opposing lobes.

8. A fastener as recited in claim 5, said socket comprising a plurality of lobes and a plurality of flutes, wherein each of the flutes and lobes is elliptically shaped, wherein center points of the ellipses which define the lobes define a first circle, wherein center points of the ellipses which define the flutes define a second circle, wherein the second circle is larger than the first circle, and wherein said first circle is closer to a center axis of the fastener than is said second circle.

9. A fastener as recited in claim 8, wherein the ellipses which define the lobes are less oblong than are the ellipses which define the flutes.

10. A fastener having a socket formed therein, said socket comprising a plurality of lobes and a plurality of flutes, said socket having a major diameter extending between opposing flutes and a minimum diameter extending between opposing lobes, wherein the major diameter is 46-49% larger than the minimum diameter.

11. A fastener as recited in claim 10, wherein each of the flutes and lobes is elliptically shaped, wherein center points of the ellipses which define the lobes define a first circle, wherein center points of the ellipses which define the flutes define a second circle, and wherein said first circle is closer to a center axis of the fastener than is said second circle.

12. A fastener as recited in claim 11, wherein the ellipses which define the lobes are less oblong than are the ellipses which define the flutes.

13. A punch pin which comprises a working end surface, said working end surface comprising a plurality of lobes and a plurality of flutes, wherein each of the flutes and lobes is elliptically curved, wherein center points of the ellipses which define the flutes define a first circle, wherein center points of the ellipses which define the lobes define a second circle, wherein the second circle is 46-49% larger than the first circle, and wherein said first circle is closer to a center axis of the punch pin than is said second circle.

14. A punch pin as recited in claim 13, wherein the ellipses which define the flutes are less oblong than are the ellipses which define the lobes.

15. A punch pin having a working end surface, wherein either the working end surface comprises a plurality of alternating structures, said alternating structures having a major diameter extending between a first set of opposing structures, and a minimum diameter extending between a second set of opposing structures, wherein the major diameter is 42-49% larger than the minimum diameter.

16. A punch pin as recited in claim 15, wherein the major diameter is 46-49% larger than the minimum diameter.

17. A fastener having a socket formed therein, wherein the socket comprises a plurality of alternating structures, said alternating structures having a major diameter extending between a first set of opposing structures, and a minimum diameter extending between a second set of opposing structures, wherein the major diameter is 42-49% larger than the minimum diameter.

18. A fastener as recited in claim 17, wherein the major diameter is 46-49% larger than the minimum diameter.

19. A fastener as recited in claim 17, wherein each of the flutes and lobes is elliptically shaped, wherein center points of the ellipses which define the lobes define a first circle, wherein center points of the ellipses which define the flutes define a second circle, and wherein said first circle is closer to a center axis of the fastener than is said second circle.

20. A fastener as recited in claim 19, wherein the second circle is 46-49% larger than the first circle, and wherein said first circle is closer to a center axis of the fastener than is said second circle.

* * * * *